United States Patent
Choi

(10) Patent No.: US 7,805,014 B2
(45) Date of Patent: Sep. 28, 2010

(54) IMAGE-ENCODING CONTROLLING APPARATUS FOR USING A TABLE REFLECTING STATISTICAL FREQUENCY OF QUANTIZATION PARAMETER SELECTION AND METHOD THEREOF

(75) Inventor: Hong-jun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1384 days.

(21) Appl. No.: 11/249,327

(22) Filed: Oct. 14, 2005

(65) Prior Publication Data

US 2006/0088095 A1    Apr. 27, 2006

(30) Foreign Application Priority Data

Oct. 21, 2004    (KR) ...................... 10-2004-0084403

(51) Int. Cl.
  *G06K 9/00*    (2006.01)
(52) U.S. Cl. ........................ 382/251; 382/232; 382/233; 382/239; 382/248; 382/250; 375/240; 375/240.02; 375/240.03; 375/240.12
(58) Field of Classification Search .................. None
  See application file for complete search history.

(56) References Cited

U.S. PATENT DOCUMENTS

2005/0147163 A1* 7/2005 Li et al. ................. 375/240.12

2007/0025441 A1* 2/2007 Ugur et al. ............. 375/240.03

FOREIGN PATENT DOCUMENTS

| JP | 08-288860 | 11/1996 |
|---|---|---|
| JP | 09-107293 | 4/1997 |
| JP | 10-174103 | 6/1998 |
| JP | 2001-078194 | 3/2001 |
| KR | 1999-0065775 | 8/1999 |
| KR | 10-2004-0011100 A | 2/2004 |

* cited by examiner

*Primary Examiner*—Andrew W Johns
*Assistant Examiner*—Jason Heidemann
(74) *Attorney, Agent, or Firm*—Roylance, Abrams, Berdo and Goodman, LLP

(57) ABSTRACT

An image-encoding method and apparatus is provided for using a table statistically reflecting a selection frequency of a quantization parameter. The method includes the steps of preparing a table representing a relationship among a target bit quantity, a quantization parameter and a selection frequency as a table for statistically reflecting a frequency of selecting a quantization parameter according to a target bit quantity. The method further includes the steps of searching for a maximum selection frequency among the selection frequencies corresponding to an input target bit quantity by referring to the table, and selecting a quantization parameter corresponding to the input target bit quantity and the searched maximum selection frequency as an optimized quantization parameter to thereby prevent inadequate image-encoding due to large amounts of computations and provide a target bit rate and uniform image quality.

17 Claims, 4 Drawing Sheets

FIG. 3

| | | QUANTIZATION PARAMETER | | | | |
|---|---|---|---|---|---|---|
| | | $Q_1$ | $Q_2$ | $Q_3$ | $\cdots$ | $Q_n$ |
| TARGET BIT QUANTITY | $B_1$ | $P_{11}$ | $P_{12}$ | $P_{13}$ | $\cdots$ | $P_{1n}$ |
| | $B_2$ | $P_{21}$ | $P_{22}$ | $P_{23}$ | $\cdots$ | $P_{2n}$ |
| | $B_3$ | $P_{31}$ | $P_{32}$ | $P_{33}$ | $\cdots$ | $P_{3n}$ |
| | $\vdots$ | $\vdots$ | $\vdots$ | $\vdots$ | $\vdots$ | $\vdots$ |
| | $B_m$ | $P_{m1}$ | $P_{m2}$ | $P_{m3}$ | $\cdots$ | $P_{mn}$ |

IMAGE-ENCODING CONTROLLING APPARATUS FOR USING A TABLE REFLECTING STATISTICAL FREQUENCY OF QUANTIZATION PARAMETER SELECTION AND METHOD THEREOF

CROSS-REFERENCE TO RELATED APPLICATIONS

This application claims the benefit under 35 U.S.C. §119(a) of Korean Patent Application No. 10-2004-0084403, filed in the Korean Intellectual Property Office on Oct. 21, 2004, the entire disclosure of which is incorporated herein by reference.

BACKGROUND OF THE INVENTION

1. Field of the Invention

The present invention relates to an image-encoding controlling apparatus and a method thereof. More particularly, the present invention relates to an image-encoding controlling apparatus for controlling an image-encoding operation of an image encoder that generates a compressed image by encoding an input image and a method thereof.

2. Description of the Related Art

An image compressing apparatus is an apparatus for generating a compressed image by compressing an input image. Such an image compressing apparatus generally includes an image encoding unit for generating a compressed image by encoding an input image, and an image-encoding controlling device for controlling an image-encoding operation of the image encoder.

FIG. 1 is a block diagram illustrating such a conventional image compressing apparatus. As shown in FIG. 1, the image compressing apparatus includes an image encoding device 20 for generating a compressed image by encoding an input image, and an image-encoding controlling device 10 for controlling an image-encoding operation of the image encoding device 20.

The image-encoding controlling device 10 maintains a fixed quantity of bits output from the image encoding device 20 by calculating an appropriate quantization parameter and applying the calculated quantization parameter to the image encoding device 20. Accordingly, the image-encoding controlling device 10 includes a complexity calculator 12, a rate-distortion (R-D) model 14 and a rate controller 16.

The complexity calculator 12 calculates a complexity of an input image and applies the calculated complexity to the rate controller 16. The rate controller 16 calculates an appropriate quantization parameter by applying the complexity of the input image from the complexity calculator 12 and a quantity of output bits of a previous image from the image encoding device 20 to the R-D model 14, which is comprised of one or more mathematical quantization parameter calculation models. The rate controller 16 also updates the R-D model 14.

The conventional image-encoding controller 10 and a method thereof have a number of drawbacks.

First, the complexity calculation requires a large amount of computations. Due to the large amount of computations, an overload is often generated. Accordingly, the complexity may not be properly and timely calculated due to the overload conditions. As a result, an image may be improperly encoded.

Second, the quantization parameter calculation, by using the mathematical quantization parameter calculation model, also requires a large amount of computations. Such a large amount of computations also generates overloads and, therefore, the image-encoding operation may not be properly achieved.

Third, the mathematical quantization parameter calculation model may generate an error while estimating a quantization parameter according to a target bit quantity, and the error may become even larger according to a compression performance of the image encoding unit and the complexity of the input image. Such an error can result in the conventional image-encoding controller using an incorrect quantization parameter for encoding a next frame. Therefore, a target bit rate and uniform image quality cannot be obtained.

The conventional image-encoding controlling device 10 and the conventional method thereof require a large amount of computations, and may inadequately encode an image due to an error generated while estimating a quantization parameter.

Accordingly, a need exists for a system and method for reducing computations and error potential when calculating an appropriate quantization parameter and applying the calculated quantization parameter to an image encoding device.

SUMMARY OF THE INVENTION

Accordingly, the present invention has been made to solve the above-mentioned and other problems, and an aspect of the present invention is to provide an image-encoding controlling apparatus using a table reflecting a statistical frequency of quantization parameter selection for preventing inadequate image-encoding due to large amounts of computations.

In accordance with an aspect of the present invention, an image-encoding controlling apparatus is provided comprising a table memory for storing a table reflecting the statistical frequency of selecting a quantization parameter according to a target bit quantity, wherein the table represents a relationship among the target bit quantity, the quantization parameter and the selection frequency. The image-encoding controlling apparatus further comprises a quantization parameter selecting unit for searching for a maximum selection frequency among the selection frequencies corresponding to an input target bit quantity by referring to the table stored in the table memory, selecting a quantization parameter corresponding to the input target bit quantity and the searched maximum selection frequency as an optimized quantization parameter, and applying the selected optimized quantization parameter to an image encoding unit.

The image-encoding controlling apparatus may further comprise a table updating unit for updating the table stored in the table memory by adding a predetermined number to a selection frequency corresponding to the input target bit quantity and the selected optimized quantization parameter.

The table updating unit may update the table stored in the table memory by subtracting a predetermined number from all of the selection frequencies corresponding to the input target bit quantity when the added selection frequency exceeds a predetermined threshold value.

The image-encoding controlling apparatus may further comprise a complexity calculating unit for calculating a complexity of a previous frame, and a target bit quantity controlling unit for controlling a target bit quantity according to the current frame by comparing the complexity of the previous frame to the target bit quantity of the current frame and applying the controlled target bit quantity to the quantization parameter selecting unit.

The complexity calculating unit may calculate a complexity of the previous frame through a computation based on a target bit quantity controlled according to the previous frame and an output bit quantity of the previous frame.

The complexity calculating unit may calculate a difference between a target bit quantity controlled according to the previous frame and an output bit quantity of the previous frame.

The table memory may store different tables corresponding to a type of a current frame.

In accordance with another aspect of the present invention, a method is provided for controlling image-encoding including the steps of preparing a table representing a relationship among a target bit quantity, a quantization parameter and a selection frequency as a table for statistically reflecting a frequency of selecting a quantization parameter according to a target bit quantity, searching for a maximum selection frequency among frequencies corresponding to an input target bit quantity by referring to the table, and selecting a quantization parameter corresponding to the input target bit quantity and the searched maximum selection frequency as an optimized quantization parameter.

The method may further comprise the step of updating the table by adding a predetermined number to a selection frequency corresponding to the input target bit quantity and the selected optimized quantization parameter.

The method may further comprise the step of updating the table by subtracting a predetermined number from all of the selection frequencies corresponding to the input target bit quantity when the added selection frequency exceeds a threshold value.

The method may further comprise the steps of calculating a complexity of a previous frame, and controlling a target bit quantity of the current frame by comparing the calculated complexity of the previous frame to a target bit quantity of a current frame.

In the step of calculating a complexity of a previous frame, the complexity of the previous frame may be calculated through a computation based on a target bit quantity controlled according to the previous frame and an output bit quantity of the previous frame.

In the step of calculating a complexity of a previous frame, a difference between a target bit quantity controlled according to the previous frame and an output bit quantity of the previous frame is calculated, and the calculated difference is output as a complexity of the previous frame.

In the step of preparing a table, different tables may be prepared according to current frame types.

BRIEF DESCRIPTION OF THE DRAWINGS

The above aspects and features of the present invention will become more apparent by describing certain exemplary embodiments of the present invention with reference to the accompanying drawings, in which:

FIG. 3 is an exemplary table stored in a table memory of an image-encoding controlling device shown in FIG. 2 in accordance with an embodiment of the present invention;

Throughout the drawings, like reference numerals will be understood to refer to like parts, components and structures.

DETAILED DESCRIPTION OF THE EXEMPLARY EMBODIMENTS

Exemplary embodiments of the present invention will now be described in greater detail with reference to the accompanying drawings.

The matters defined in the description, such as detailed construction and element descriptions, are provided to assist in a comprehensive understanding of the invention. Also, functions or constructions that are well known to those skilled in the art are omitted for clarity and conciseness.

Figure 1:
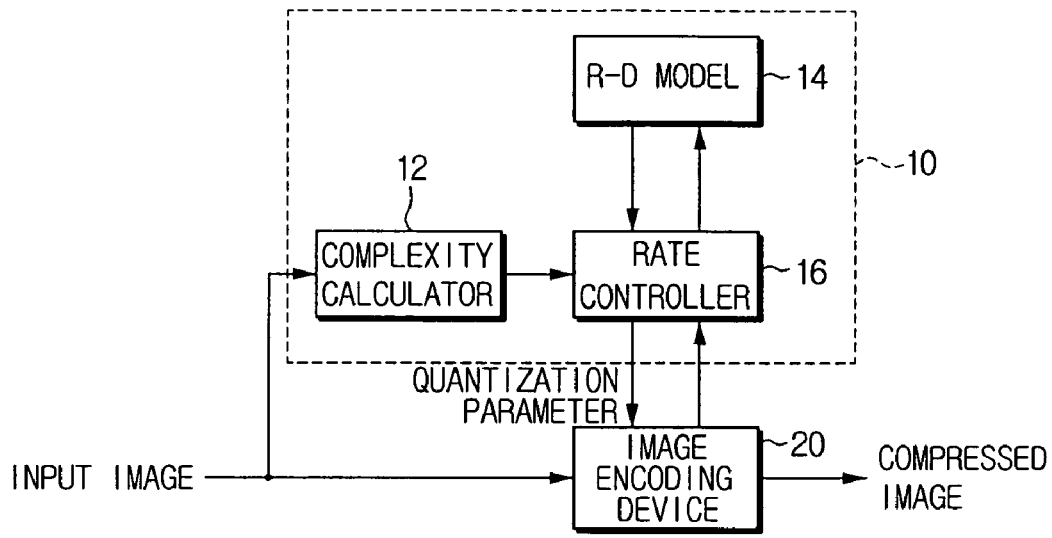
FIG. 1 is a block diagram illustrating a conventional image compressing apparatus.
Figure 2:
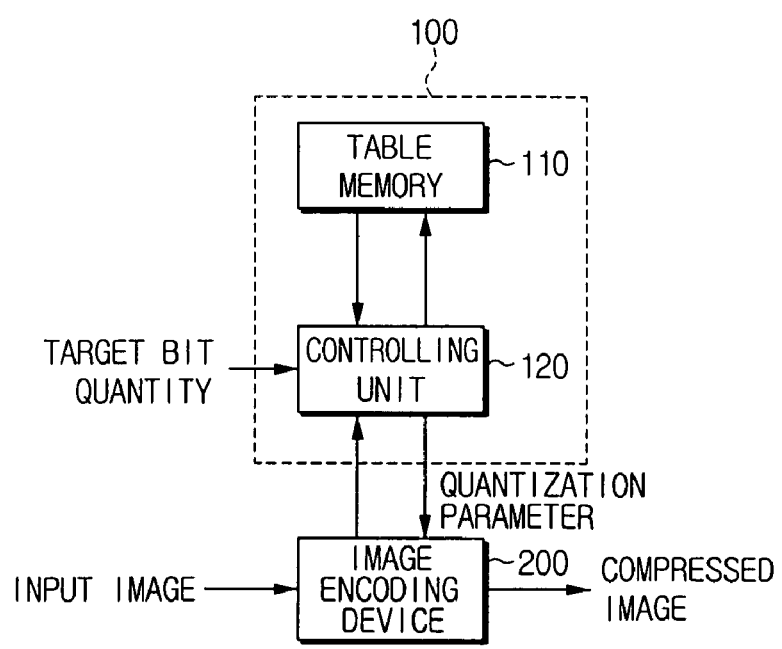
FIG. 2 is a block diagram illustrating an image compressing apparatus including an image-encoding controlling device in accordance with an embodiment of the present invention.

FIG. 2 is a block diagram illustrating an image compressing apparatus including an image-encoding controlling device in accordance with an embodiment of the present invention.

Referring to FIG. 2, the image compressing apparatus comprises an image-encoding controlling device 100 and an image encoding device 200.

The image encoding device 200 generates a compressed image by encoding an input image and outputs the compressed image. The image encoding device 200 encodes the input image substantially as follows. First, the image encoding device 200 divides an input image, which is input in frame units, into a plurality of blocks. After dividing the input image, the image encoding device 200 performs a discrete cosine transform (DCT) on the divided blocks and quantizes the transformed blocks. The quantized blocks are encoded based on a variable length encoding scheme.

While quantizing the transformed blocks, parameters of the transformed blocks are divided by a quantization parameter and a dividing result is rounded off to the nearest integer for eliminating parameters which are below a predetermined threshold value and for obtaining valid parameters which are higher than the predetermined threshold value. By quantizing the transformed blocks, a bit quantity of a compressed image (that is, a quantity of bits output from the image encoding device 200) dramatically decreases as compared to a bit quantity of the input image. A decreased bit quantity is determined by the quantization parameter. That is, if the quantization parameter is large, a large decrease will be achieved, and if the quantization parameter is small, a smaller decrease will be achieved. If the quantization parameter is large, a bit quantity of a compressed image which is a quantity of bits output from the image encoding device 200 would be small. If the quantization parameter is small, the bit quantity of the compressed image would be large.

The image-encoding controlling device 100 adequately maintains a quantity of bits output from the image encoding device 200 by controlling image-encoding operations of the image encoding device 200. Hereinafter, the quantity of bits output from the image encoding device 200 is referred to as an "output bit quantity". The image-encoding controlling device 100 comprises a table memory 100 and a controlling unit 120.

The table memory 110 is comprised of a recording medium for storing a table reflecting a statistical frequency of selecting a quantization parameter according to a target bit quantity. Hereinafter, the table reflecting the statistical frequency of selecting a quantization parameter is referred to as a "table" for the convenience of explaining embodiments of the present invention. The reflection of the frequency of selecting a quantization parameter according to the target bit quantity can be expressed by relationships among the target bit quantity, the quantization parameter and the selection frequency in the table.

The table is statistically produced and updated. That is, the table is prepared by reflecting a statistical frequency of selecting a quantization parameter according to the target bit quantity when it is initially produced. The table is then updated by statistically reflecting a selection result of quantization parameters according to the target bit quantity.

FIG. 3 is an exemplary table stored in the table memory 110 of the image-encoding controlling device shown in FIG. 2 in accordance with an embodiment of the present invention. As shown, in a first column of the table, target bit quantities ($B_1$, $B_2$, $B_3$, ..., $B_m$) are arranged and the quantization parameters ($Q_1$, $Q_2$, $Q_3$, ..., $Q_n$) are arranged in a first row. In cells where the rows and columns cross, frequencies ($P_{11}$, $P_{12}$, $P_{13}$, ..., $P_{1n}$, $P_{2l}$, ..., $P_{mn}$) of selecting corresponding quantization parameters Q according to corresponding target bit quantities B, are arranged.

Referring to FIG. 2, the target bit quantity and the quantization parameter may be provided as an input and an output of the controlling unit 120, respectively. The selection frequency denotes a frequency of outputting a corresponding quantization parameter from the controlling unit 120 when the target bit quantity is input to the controlling unit 120. For example, the selection frequency $P_{11}$ is a frequency of outputting a quantization parameter $Q_1$ from the controlling unit 120 when the target bit quantity $B_1$ is input to the controlling unit 120.

The table represents a relationship among the target bit quantity, the quantization parameter and the frequency of selection. Therefore, when a frequency of input (target bit quantity)—output (quantization parameter) is high, the corresponding selection frequency would have a larger value.

The controlling unit 120 selects the appropriate quantization parameter for matching the output bit quantity to the target bit quantity, and applies the selected quantization parameter to the image encoding device 200. When the controlling unit 120 selects the quantization parameter, the controlling unit 120 uses the table stored in the table memory 110. The controlling unit 120 also updates the table.

Hereinafter, the controlling unit 120 will be explained in greater detail with reference to the FIG. 4.

Figure 4:
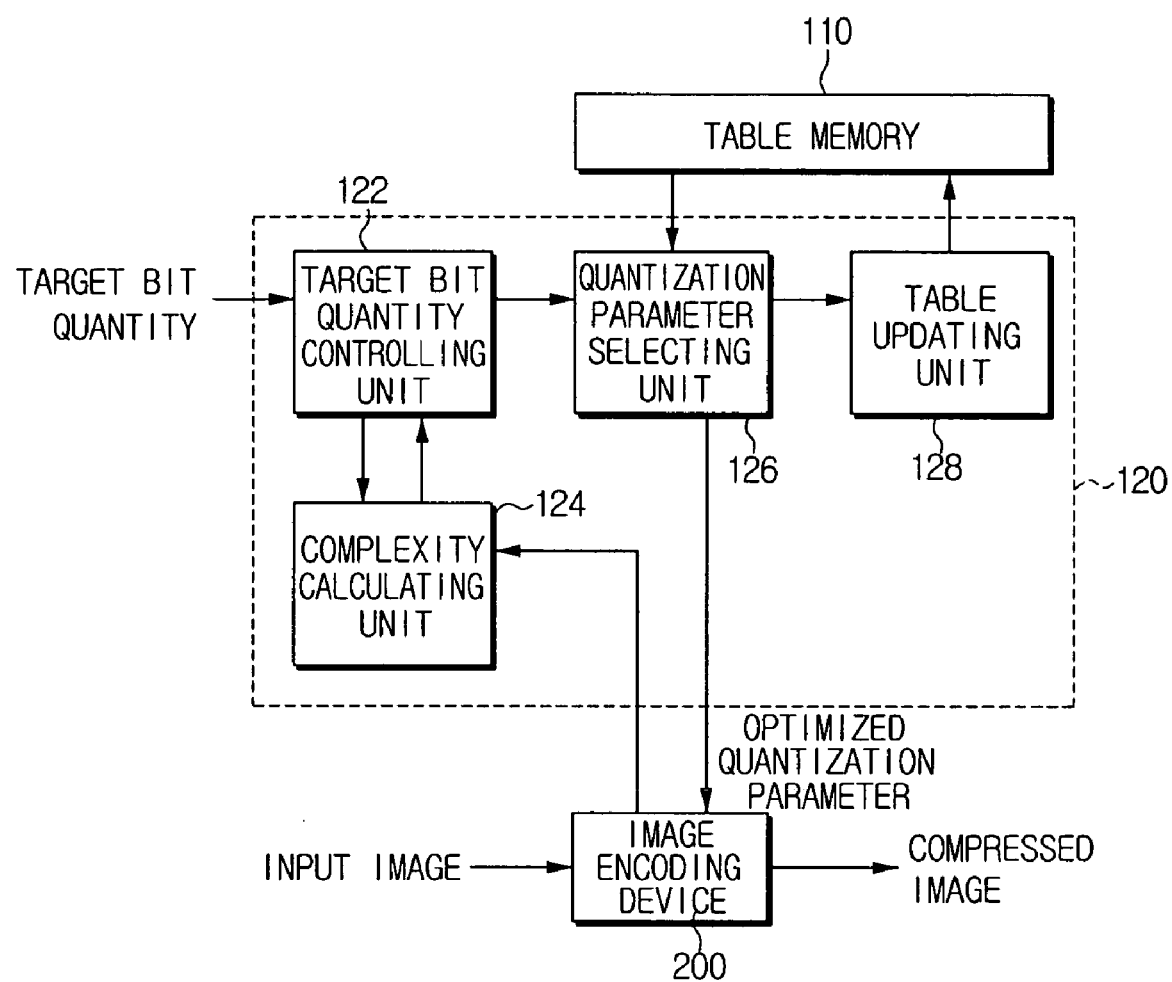
FIG. 4 is a detailed block diagram illustrating a controller in an image-encoding controlling device shown in FIG. 2 in accordance with an embodiment of the present invention.

FIG. 4 is a detailed block diagram of the controlling unit 120 in the image-encoding controlling device shown in FIG. 2 in accordance with an embodiment of the present invention. In FIG. 4, the table memory 110 and the image encoding device 200 are added for the convenience of the explanation.

Referring to FIG. 4, the controlling unit 120 comprises a target bit quantity controlling unit 122, a complexity calculating unit 124, a quantization parameter selecting unit 126 and a table updating unit 128.

The target bit quantity controlling unit 122 receives a target bit quantity of a current frame, and controls the received target bit quantity. That is, the target bit quantity controlling unit 122 controls the target bit quantity of the current frame based on a method reflecting a complexity of a previous frame to the target bit quantity of the current frame. The target bit quantity controlling unit 122 applies the controlled target bit quantity to the quantization parameter selecting unit 126.

The complexity calculating unit 124 calculates a complexity of a previous frame and applies the calculated complexity to the target bit quantity controlling unit 122. In more detail, the complexity calculating unit 124 calculates the complexity of the previous frame based on the output bit quantity of the previous frame and the controlled target bit quantity of the previous frame. For example, the complexity calculating unit 124 obtains a difference between the output bit quantity of the previous frame and the controlled target bit quantity of the previous frame, and outputs the difference as the complexity of the previous frame.

For explaining exemplary operations of the target bit quantity controlling unit 122 and the complexity calculating unit 124 with reference to FIG. 3, it can be assumed, for example, that a complexity of the previous frame calculated from the complexity calculating unit 124 is M and that a target bit quantity of a current frame input to the target bit quantity controlling unit 122 is $B_3$. In this case, the target bit quantity controlling unit 122 subtracts M from $B_3$ and applies the subtraction result $B_3$–M as the controlled target bit quantity to the quantization parameter selecting unit 126. If, for example, $B_3$–M is $B_2$, the controlled target bit quantity applied from the target bit quantity controlling unit 122 to the quantization parameter selecting unit 126 is $B_2$.

The quantization parameter selecting unit 126 searches for a maximum selection frequency among selection frequencies corresponding to the controlled target bit quantity applied from the target bit quantity controlling unit 122 by referring to the table stored in the table memory 110. The quantization parameter selecting unit 126 selects a quantization parameter corresponding to the controlled target bit quantity and the searched maximum selection frequency as the optimized quantization parameter. The quantization parameter selecting unit 126 then applies the selected optimized quantization parameter to the image encoding device 200.

For explaining exemplary operations of the quantization parameter selecting unit 126 with reference to FIG. 3, it can be assumed, for example, that a controlled target bit quantity applied from the target bit quantity controlling unit 122 to the quantization parameter selecting unit 126 is $B_2$ and that a maximum selection frequency among selection frequencies of ($P_{21}$, $P_{22}$, $P_{23}$, ..., $P_{2n}$) corresponding to $B_2$ is $P_{22}$. In this case, the quantization parameter selecting unit 126 searches for the maximum selection frequency ($P_{22}$) among the selection frequencies ($P_{21}$, $P_{22}$, $P_{23}$, ..., $P_{2n}$) corresponding to $B_2$. The quantization parameter selecting unit 126 then selects a quantization parameter $Q_2$ corresponding to the searched maximum selection frequency $P_{22}$ and the controlled target bit quantity $B_2$ as the optimized quantization parameter. The selected optimized quantization parameter $Q_2$ is then applied to the image encoding device 200.

The image encoding device 200 encodes a current frame by using the optimized quantization parameter applied from the quantization parameter selecting unit 126.

The table updating unit 128 updates the table stored in the table memory 110 by adding a predetermined number to the selection frequency corresponding to the controlled target bit quantity from the target bit quantity controlling unit 122 and the optimized quantization parameter from the quantization parameter selecting unit 126.

The table updating unit 128 subtracts a predetermined number from selection frequencies corresponding to the controlled target bit quantity when the added selection frequency exceeds a predetermined threshold value, thereby updating the table stored in the table memory 110 again. This prevents the selection frequencies of the table from becoming extremely large numbers.

For explaining exemplary operations of the table updating unit 128 with reference to FIG. 3, it can be assumed, for example, that the target bit quantity controlled in the target bit quantity controlling unit 122 is $B_2$ and that the optimized quantization parameter selected in the quantization parameter selecting unit 126 is $Q_2$. In this case, the table updating unit 128 updates the table stored in the table memory 110 by adding a predetermined number, for example, 1 to the selection frequency $P_{22}$ corresponding to the controlled target bit quantity $B_2$ and the selected optimized quantization parameter $Q_2$. As a result, $P_{22}$ of the table is updated to $P_{22}+1$ and its value becomes larger.

If the added selection frequency of $P_{22}+1$ exceeds the predetermined threshold value T ($P_{22}+1>T$), the table stored in the table memory 110 is updated by subtracting a predetermined number, for example, 1 from all of the selection frequencies ($P_{21}$, $P_{22}+1$, $P_{23}$, . . . , $P_{2n}$) corresponding to the controlled target bit quantity $B_2$. As a result, the values ($P_{21}$, $P_{22}+1$, $P_{23}$, . . . , $P_{2n}$) of the table are updated to ($P_{21}-1$, $P_{22}$, $P_{23}-1$, . . . , $P_{2n}-1$). Therefore, there is no selection frequency exceeding the threshold value T.

The complexity calculating unit 124 calculates a complexity of a current frame by using an output bit quantity of a current frame output from the image encoding device 200 and the controlled target bit quantity of a current frame calculated in the target bit quantity controlling unit 122. The complexity of the current frame is applied to the target bit quantity controlling unit 122 and the target bit quantity controlling unit 122 uses the applied complexity to control a target bit quantity of a next frame.

Hereinafter, a method for controlling image-encoding in accordance with an embodiment of the present invention will be described with reference to FIG. 5.

Figure 5:
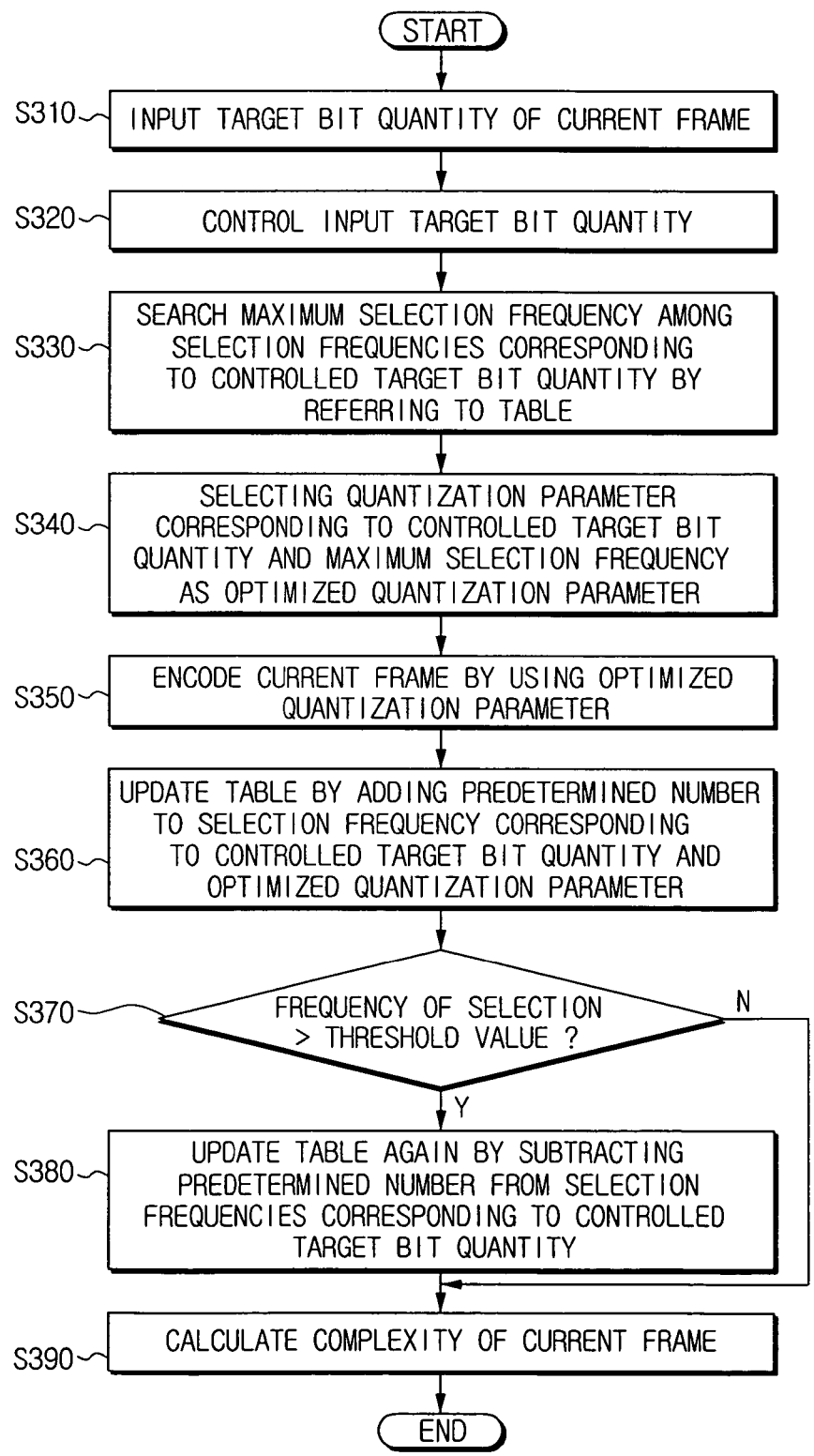
FIG. 5 is a flowchart depicting a method of controlling an image-encoding in accordance with an embodiment of the present invention.

FIG. 5 is a flowchart illustrating a method of controlling an image-encoding in accordance with an embodiment of the present invention.

Referring to FIG. 5, a target bit quantity of a current frame is input at step S310 and the input target bit quantity is controlled at step S320. Controlling of the target bit quantity can be achieved by comparing a complexity of a previous frame to the target bit quantity of the current frame. The complexity of the previous frame is calculated through a calculation based on an output bit quantity of the previous frame and the controlled target bit quantity according to the previous frame, for example, by the calculation of a difference between the output bit quantity of the previous frame and the controlled target bit quantity according to the previous frame.

Referring to the table, a maximum selection frequency having a maximum value is searched among the selection frequencies corresponding to the controlled target bit quantity at step S330.

A quantization parameter corresponding to the controlled target bit quantity and the searched maximum selection frequency is selected as an optimized quantization parameter at step S340.

The current frame is encoded by using the selected optimized quantization parameter at step S350.

The table is updated by adding a predetermined number to a selection frequency corresponding to the optimized quantization parameter and the controlled target bit quantity at step S360.

If the added selection frequency exceeds a predetermined threshold value at step S370, the table is updated again by subtracting a predetermined number from all of the selection frequencies corresponding to the controlled target bit quantity at step S380. This prevents the selection frequencies of the table from becoming extremely large values.

A complexity of the current frame is calculated through a computation based on an output bit quantity of the encoded current frame and the controlled target bit quantity at step S390. The calculated complexity of the current frame is then used to control a target bit quantity of a next frame.

The flowchart of FIG. 5 illustrates a method for controlling image-encoding of a single frame, that is, the current frame. Generally, the input image is constructed with consecutive frames. Accordingly, the steps 310 to 390 are performed for a next frame when the next frame is encoded. That is, the steps S310 to S390 are repeatedly performed as many times as the number of frames included in the input image for encoding input image including consecutive frames and for controlling image-encoding.

In the exemplary embodiments of the present invention described above, an image-encoding device using a table reflecting the statistical frequency of selecting quantization parameters according to a target bit quantity and a method thereof are explained. In embodiments of the present embodiment described above, a single table is used. However, a current frame may be comprised of any one of various types of frames such as an intra (I) frame, a predictive (P) frame and a bidirectional predictive (B) frame. Therefore, in yet other embodiments of the present invention various tables can be used, wherein the various tables are produced in accordance with a corresponding type of the input image.

The target bit quantities ($B_1$, $B_2$, $B_3$, . . . , $B_m$) denote a special bit value. However, in yet other embodiments of the present invention the target bit quantities ($B_1$, $B_2$, $B_3$, . . . , $B_m$) may denote a predetermined bit range. Also, the target bit quantities ($B_1$, $B_2$, $B_3$, . . . , $B_m$) may denote a representative value of a predetermined bit range, for example, an intermediate value of the bit range.

As described above, an image-encoding is controlled by using a table reflecting a statistical selection frequency of a quantization parameter according to a target bit quantity in accordance with embodiments of the present invention. Accordingly, large amounts of computations are not required for calculating a complexity of an input image and a quantization parameter by controlling the image-encoding according to embodiments of the present embodiment. As a result, embodiments of the present invention prevent inadequate image-encoding due to the large amount of computations, and provide a desired target bit rate and a uniform image quality.

The foregoing embodiments and advantages are merely exemplary and are not to be construed as limiting the present invention. The present teachings can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image-encoding controlling apparatus, comprising:
a table memory for storing a table reflecting a statistical frequency of selecting a quantization parameter according to a target bit quantity, wherein the table represents a relationship among the target bit quantity, the quantization parameter and the selection frequency; and
a quantization parameter selecting unit for searching for a maximum selection frequency among the selection frequencies corresponding to an input target bit quantity by referring to the table stored in the table memory, selecting a quantization parameter corresponding to the input target bit quantity and the searched maximum selection frequency as an optimized quantization parameter, and applying the selected optimized quantization parameter to an image encoding unit.

2. The image-encoding controlling apparatus of claim 1, further comprising:
a table updating unit for updating the table stored in the table memory by adding a predetermined number to the selection frequency corresponding to the input target bit quantity and the selected optimized quantization parameter.

3. The image-encoding controlling apparatus of claim 2, wherein the table updating unit is configured to update the table stored in the table memory by subtracting a predetermined number from all of the selection frequencies corresponding to the input target bit quantity when the added selection frequency exceeds a predetermined threshold value.

4. The image-encoding controlling apparatus of claim 1, further comprising:
   a complexity calculating unit for calculating a complexity of a previous frame; and
   a target bit quantity controlling unit for controlling a target bit quantity according to a current frame by comparing the complexity of the previous frame to the target bit quantity of the current frame, and applying the controlled target bit quantity to the quantization parameter selecting unit.

5. The image-encoding controlling apparatus of claim 4, wherein the complexity calculating unit is configured to calculate the complexity of the previous frame through a computation based on a target bit quantity controlled according to the previous frame and an output bit quantity of the previous frame.

6. The image-encoding controlling apparatus of claim 5, wherein the complexity calculating unit is configured to calculate a difference between a target bit quantity controlled according to the previous frame and an output bit quantity of the previous frame, and output the difference as the complexity of the previous frame.

7. The image-encoding controlling apparatus of claim 1, wherein the table memory is configured to store different tables corresponding to a type of a current frame.

8. A method for controlling image-encoding, comprising the steps of:
   preparing a table representing a relationship among a target bit quantity, a quantization parameter and a selection frequency for statistically reflecting a frequency of selecting a quantization parameter according to a target bit quantity;
   searching for a maximum selection frequency among the selection frequencies corresponding to an input target bit quantity by referring to the table; and
   selecting a quantization parameter corresponding to the input target bit quantity and the searched maximum selection frequency as an optimized quantization parameter.

9. The method of claim 8, further comprising the step of:
   updating the table by adding a predetermined number to the selection frequency corresponding to the input target bit quantity and the selected optimized quantization parameter.

10. The method of claim 9, further comprising the step of:
    updating the table by subtracting a predetermined number from all of the selection frequencies corresponding to the input target bit quantity when the added selection frequency exceeds a threshold value.

11. The method of claim 8, further comprising the steps of:
    calculating a complexity of a previous frame; and
    controlling a target bit quantity of a current frame by comparing the calculated complexity of the previous frame to a target bit quantity of a current frame.

12. The method of claim 11, wherein in the step of calculating a complexity of a previous frame, the complexity of the previous frame is calculated through a computation based on a target bit quantity controlled according to the previous frame and an output bit quantity of the previous frame.

13. The method of claim 12, wherein in the step of calculating a complexity of a previous frame, a difference between a target bit quantity controlled according to the previous frame and an output bit quantity of the previous frame is calculated and the calculated difference is output as a complexity of the previous frame.

14. The method of claim 8, wherein in the step of preparing a table, a plurality of different tables are prepared according to types of current frames.

15. A computer program product embodied on a non-transitory computer-readable medium for controlling image-encoding, comprising:
    a first set of instructions for controlling an image-encoding controlling device to prepare a table representing a relationship among a target bit quantity, a quantization parameter and a selection frequency for statistically reflecting a frequency of selecting a quantization parameter according to a target bit quantity;
    a second set of instructions for controlling the image-encoding controlling device to search for a maximum selection frequency among the selection frequencies corresponding to an input target bit quantity by referring to the table; and
    a third set of instructions for controlling the image-encoding controlling device to select a quantization parameter corresponding to the input target bit quantity and the searched maximum selection frequency as an optimized quantization parameter.

16. The computer program product embodied on a non-transitory computer-readable medium of claim 15, further comprising:
    a fourth set of instructions for controlling an image-encoding controlling device to update the table by adding a predetermined number to the selection frequency corresponding to the input target bit quantity and the selected optimized quantization parameter.

17. The computer program product embodied on a non-transitory computer-readable medium of claim 15, further comprising:
    a fifth set of instructions for controlling an image-encoding controlling device to update the table by subtracting a predetermined number from all of the selection frequencies corresponding to the input target bit quantity when the added selection frequency exceeds a threshold value.

* * * * *